United States Patent
Izumi et al.

(10) Patent No.: US 7,660,645 B2
(45) Date of Patent: Feb. 9, 2010

(54) PRODUCTION MANAGEMENT METHOD AND PRODUCTION MANAGEMENT SYSTEM

(75) Inventors: Hiroaki Izumi, Tokyo (JP); Katsuhiko Takahashi, Tokyo (JP)

(73) Assignee: Elpida Memory, Inc., Tokyo (JP)

( * ) Notice: Subject to any disclaimer, the term of this patent is extended or adjusted under 35 U.S.C. 154(b) by 0 days.

(21) Appl. No.: 11/710,969

(22) Filed: Feb. 27, 2007

(65) Prior Publication Data

US 2007/0203601 A1    Aug. 30, 2007

(30) Foreign Application Priority Data

Feb. 28, 2006 (JP) ............................. 2006-052996

(51) Int. Cl.
G06F 19/00 (2006.01)
(52) U.S. Cl. ........................................ 700/121; 700/97
(58) Field of Classification Search ........... 700/95–107, 700/121, 117; 705/7–10; 379/10, 14, 15, 379/34, 149; 438/486, 693
See application file for complete search history.

(56) References Cited

U.S. PATENT DOCUMENTS

| | | | | |
|---|---|---|---|---|
| 5,100,276 A | * | 3/1992 | Iwasaki et al. | 414/222.06 |
| 5,341,304 A | * | 8/1994 | Sakamoto et al. | 700/110 |
| 6,230,068 B1 | * | 5/2001 | Wu et al. | 700/121 |
| 6,400,999 B1 | * | 6/2002 | Kashiyama et al. | 700/100 |
| 6,438,436 B1 | * | 8/2002 | Hohkibara et al. | 700/97 |
| 6,999,081 B1 | * | 2/2006 | Lin et al. | 345/440.2 |
| 2001/0027406 A1 | * | 10/2001 | Araki et al. | 705/8 |
| 2003/0139936 A1 | * | 7/2003 | Saucier et al. | 705/1 |
| 2004/0073322 A1 | * | 4/2004 | Maenishi et al. | 700/28 |
| 2005/0261921 A1 | * | 11/2005 | Chien et al. | 705/1 |

FOREIGN PATENT DOCUMENTS

JP     11-145021     5/1999

* cited by examiner

Primary Examiner—Kidest Bahta
(74) Attorney, Agent, or Firm—Young & Thompson

(57) ABSTRACT

Processing apparatuses A, B, C, and D are included in a job-shop production line, and process 1 to process 6 are performed by the processing apparatuses A, B, C, B, D, and B, respectively. The processing apparatus B is repeatedly used in process 2, process 4, and process 6; therefore, these processes are key processes. Based on the key processes, process 1 to process 6 are classified into a plurality of groups, and the number of in-process products of each of the groups is counted by a counting unit. According to this, a determining unit determines priority orders of the key processes such that a higher priority is given to a key process in a group having a large number of the in-process products. Thus, it becomes possible to perform determination of the priority orders further according to an actual situation, and to improve production efficiency.

15 Claims, 14 Drawing Sheets

| | NORMAL MODE (PRESS SELECTION BUTTON 61) | ADJUSTMENT MODE (PRESS SELECTION BUTTON 62) |
|---|---|---|
| ELIMINATE PILE OF IN-PROCESS PRODUCTS (PRESS SELECTION BUTTON 51) | SELECT FIRST ALGORISM | SELECT SECOND ALGORISM |
| EQUALIZE (PRESS SELECTION BUTTON 52) | SELECT THIRD ALGORISM | SELECT FOURTH ALGORISM |
| FILL PROCESS HAVING LOW IN-PROCESS PRODUCTS ACCUMULATION (PRESS SELECTION BUTTON 53) | SELECT FIFTH ALGORISM | SELECT SIXTH ALGORISM |

FIG.4

| STORAGE CABINET /STORAGE AREA | 10a | $10b_1$ | 10c | $10b_2$ | 10d | $10b_3$ |
|---|---|---|---|---|---|---|
| NUMBER OF IN-PROCESS PRODUCTS | a=9 | b1=9 | c=7 | b2=2 | d=3 | b3=10 |

|  | G1 | | G2 | | G3 | |
|---|---|---|---|---|---|---|
| PROCESSING APPARATUS (PROCESS) | A PROCESS 1 | B PROCESS 2 | C PROCESS 3 | B PROCESS 4 | D PROCESS 5 | B PROCESS 6 |
| REQUIRED PROCESSING TIME | Ta=1.5 | Tb=1 | Tc=1 | Tb=1 | Td=0.5 | Tb=1 |
|  | TG1 =2.5 | | TG2 =2 | | TG3 =1.5 | |

FIG.7

| PROCESS | 1 | 2 | 3 | 4 | 5 | 6 |
|---|---|---|---|---|---|---|
| PROCESSING APPARATUS | A | B | C | B | D | B |
| NUMBER OF IN-PROCESS PRODUCTS | 1 | 3 | 1 | 4 | 4 | 2 |

PRODUCTION MANAGEMENT METHOD AND PRODUCTION MANAGEMENT SYSTEM

TECHNICAL FIELD

The present invention relates to a production management method and a production management system, and, more particularly to a production management method and a production management system that manage a production line including a plurality of key processes in which an identical processing apparatus is commonly used.

BACKGROUND OF THE INVENTION

Conventionally, in producing the same product in a large quantity, it is common to perform a series of processes on a production line. Such a production line is called a "conveyer production line" and is widely adopted in manufacturing products such as automobiles. In the conveyor line method, it is important to keep a processing time required for each process included in the production line constant. This is because if one process takes a longer processing time compared to other processes, this process becomes a bottleneck and reduces the operation rate of processing apparatus used in other processes.

On the other hand, in a production line of semiconductor chips or the like, the same processing apparatus can be commonly used in more than one process, unlike the conveyor line method. Such a production line is called a "job-shop production line". For example, in semiconductor chip manufacturing, processes such as wafer cleaning, film formation of conductive material or a dielectric material, photolithography, and etching are repeated many times.

Among these processes, in the wafer cleaning, a number of wafers can be collectively processed even if the same processing apparatus (a cleaning apparatus) is commonly used in more than one process. Therefore, there are few cases where this process becomes a bottleneck. In the film formation process and the etching process, it is often difficult to commonly use the same processing apparatus (a film-formation chamber and an etching chamber) in more than one process since conditions such as process gases are different depending on materials to be formed into a film or to be etched. With this reason, in the film formation process and the etching process, a chamber specially prepared for each process is often used. Therefore, there are few cases where these processes become a bottleneck either. However, the film formation process and the etching process may be a bottleneck due to failure of the apparatus.

In contrast to this, since a stepper is considerably expensive, the same stepper is commonly used in more than one photolithography process generally. In addition, unlike the cleaning process and the like, it is impossible to collectively process a number of wafers, and required to process wafers one by one. Therefore, in production lines of semiconductor chips, the photolithography process is the bottleneck in most of the cases.

In the job-shop production line, if a key process (the photolithography process in the above example) in which the same processing apparatus is commonly used in more than one process becomes a bottleneck, it can be very difficult to decide which in-process product should be processed in priority among in-process products accumulated before the bottleneck apparatus (the stepper in the above example).

FIG. 14A is a schematic diagram showing processing apparatuses used in one example of a job-shop production line. FIG. 14B is a table showing processing apparatuses used in respective processes shown in FIG. 14 and the number of in-process products that are accumulated therebefore.

As shown in FIG. 14A, this production line is composed of four processing apparatuses A, B, C, and D, and a process performed with the processing apparatus B is the key process among these processes. Specifically, six processes, process 1 to process 6, are performed in this production line as shown in FIG. 14B, and the processing apparatus B is used in process 2, process 4, and process 6.

In process 2, process 4, and process 6 in which the same processing apparatus B is used, three production lots, four production lots, and two production lots of in-process products are accumulated respectively as shown in FIG. 14B. In this case, the processing apparatus B is required to make some determination on which of the in-process products should be processed in priority. Although it is generally determined that the process (process 4 in this example) having the most in-process products should take priority, such simple determination is not necessarily appropriate in an actual production line.

On the other hand, as a method of determining priority orders in the job-shop production line, a determining method described in Japanese Patent Application Laid-open No. H11-145021 is known. In the technique disclosed in the Japanese Patent Application Laid-open No. H11-145021, however, the priority orders are determined merely based on a processing time required in a process subsequent to a key process to be the bottleneck; therefore, by this method, it is impossible to ease accumulation of many in-process products at the key process, to equalize the number of in-process products at respective processes, nor to prevent reduction of the operation rate of the processing apparatuses. Further, in a production line of semiconductor chips, CONWIP (CONstant Work-In-Process) in which manufacturing of new products is started for an amount equivalent to the number of finished products is often adopted. Therefore, by the method described in the Japanese Patent Application Laid-open No. H11-145021, the priority orders cannot be properly determined in consideration to the CONWIP.

SUMMARY OF THE INVENTION

The present invention has been achieved to solve the above problems. It is therefore an object of the present invention is to provide an improved production management method and an improved production management system with which a job-shop production line.

Another object of the present invention is to provide a production management method and a production management system capable of easing accumulation of many in-process products at a key process.

A still another object of the present invention is to provide a production management method and a production management system capable of equalizing the number of in-process products accumulated in a job-shop production line.

A still another object of the present invention is to provide a production management method and a production management system capable of preventing reduction of an operation rate of a processing apparatus in a job-shop production line.

The above and other objects of the present invention can be accomplished by a production management method for a production line including a series of processes that includes a plurality of key processes in which a same processing apparatus is commonly used, the series of processes are classified into a plurality of groups based on the key processes, comprising:

a first step for obtaining number of in-process products that are present in each group; and a second step for determining priority orders of the key processes based on the obtained number of the in-process products in each group.

The above and other objects of the present invention can also be accomplished by a production management method for a production management system that manages a production line including a series of processes that includes a plurality of key processes in which a same processing apparatus is commonly used, the series of processes are classified into a plurality of groups based on the key processes, comprising:

a counting unit that obtains number of in-process products of each group; and a determining unit that determines priority orders of the key processes based on the obtained number of the in-process products of each of the groups.

Thus, in the present invention, a series of processes is classified into the groups based on the key processes, and the number of the in-process products of each of the groups is used as a parameter, not using the number of the in-process products accumulated immediately before a key process or a required processing time in a process immediately after a key process as a parameter as in conventional techniques. This enables determination of the priority orders further according to an actual situation and improvement of production efficiency.

It is preferable to perform grouping such that from a point after a predetermined key process up to a next key process is to be grouped as one group. Further, the first group is preferable to at least include a point before the first process up to the first key process included in the production line. When the CONWIP is considered, the first group is preferable to further include a point after the last key process up to the last process included in the production line.

It is preferable that the priority orders are determined such that higher priority is given to a key process in a group having a large number of the in-process products. In a case where the numbers of the in-process products are significantly different between groups at a steady state, it is preferable to give higher priority to a key process in a group for which a required processing time is short, in addition to the above. If the priority orders are determined based such a criterion, it becomes possible to ease accumulation of many in-process products at a key process.

Furthermore, it is preferable that the priority orders are determined such that higher priority is given to a key process in a predetermined group when the number of the in-process products corresponding to the predetermined group is larger than the number of the in-process products corresponding to a next group. In a case where the numbers of the in-process products are significantly different between groups at a steady state, it is preferable to give higher priority to a key process in a predetermined group when a required processing time for the predetermined group is shorter than a required processing time for a next group, in addition to the above. If the priority orders are determined based on such a criterion, it becomes possible to equalize the number of the in-process products in a job-shop production line.

Furthermore, it is preferable that the priority orders are determined such that higher priority is given to a key process in a group immediately before a group having a small number of the in-process products. In a case where the numbers of the in-process products are significantly different between groups at a steady state, it is preferable to give higher priority to a key process in a group immediately before a group for which a required processing time is shorter. If the priority orders are determined based on such a criterion, it becomes possible to prevent reduction of an operation rate of the processing apparatuses in a job-shop production line.

Thus, according to the present invention, the priority orders for a process in the key processes are determined using the number of the in-process products of each of the groups as a parameter. Therefore, it becomes possible to determine the priority orders further according to an actual situation and to improve production efficiency.

BRIEF DESCRIPTION OF THE DRAWINGS

The above and other objects, features and advantages of this invention will become more apparent by reference to the following detailed description of the invention taken in conjunction with the accompanying drawings, wherein:

FIG. 4 is a table showing selection conditions for an algorism;

FIG. 6 is a table showing specific values of the number of in-process products;

FIG. 7 is a table showing specific values of required processing times;

DETAILED DESCRIPTION OF THE EMBODIMENTS

Preferred embodiments of the present invention will now be described in detail hereinafter with reference to the accompanying drawings.

Figure 1:
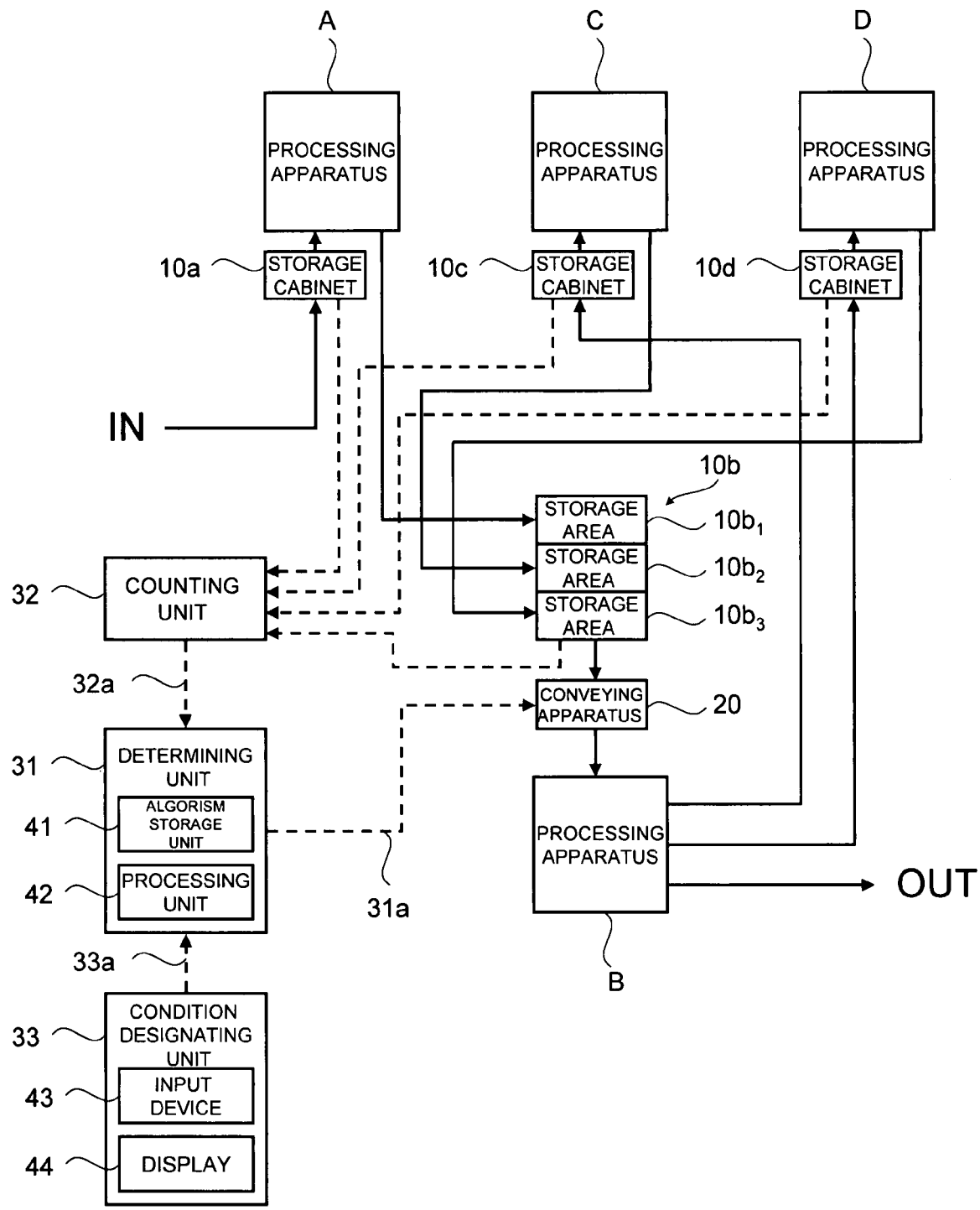
FIG. 1 is a schematic diagram showing a production line to which a production management system according to a preferred embodiment of the present invention is introduced.

FIG. 1 is a schematic diagram showing a production line to which a production management system according to a preferred embodiment of the present invention is introduced. In FIG. 1, a solid line arrow shows a flow of an in-process product, and a dotted-line arrow shows a flow of a signal.

Although it is not particularly limited, the production line shown in FIG. 1 is a production line of a semiconductor chip and so-called the job-shop product line. For convenience of explanation, it is assumed that the processing apparatuses composing the production line are only four types of A, B, C, and D similarly to the example shown in FIG. 14A, and that the line is completed by six processes from process 1 to process 6. In other words, process 1 to process 6 are performed with the processing apparatuses A, B, C, B, D, and B, respectively.

Figures 14A, 14B:
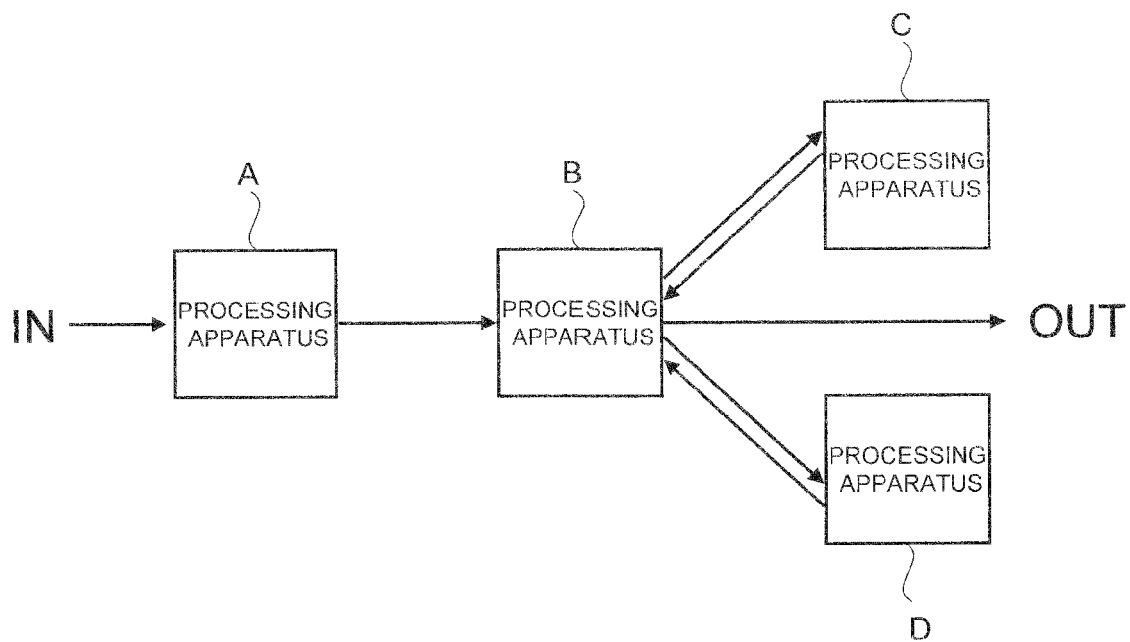
FIG. 14A is a schematic diagram showing processing apparatuses used in one example of a job-shop production line.
FIG. 14B is a table showing processing apparatuses used in respective processes shown in FIG. 14 and the number of in-process products that are accumulated therebefore.

Similarly to the example shown in FIG. 14A, among the four processing apparatuses A, B, C, and D, the processing apparatus repeatedly used in more than one process (process 2, process 4, and process 6) is the processing apparatus B, and these processes are the key processes. As described above, in a production line of semiconductor chips, the photolithography process becomes the key process in many cases. In this case, the processing apparatus B is the stepper. As other processing apparatuses A, C, and D, a cleaning apparatus, a film forming apparatus, and an etching apparatus are included. What type of apparatuses these processing apparatuses A, B, C, and D specifically are is not directly related to the scope of the present invention, and the apparatuses can be of any type.

As shown in FIG. 1, storage cabinets 10a to 10d are assigned to the processing apparatuses A, B, C, and D, respectively. The storage cabinets 10a to 10d are cabinets to store in-process products (semiconductor wafers) to be processed by the processing apparatuses A, B, C, and D corresponding thereto. Therefore, the in-process products stored in the storage cabinets 10a, 10c, and 10d are, as obvious from FIG. 2 showing a flow of an in-process product, the in-process products positioned before process 1, process 3, and process 5 using the processing apparatuses A, C, and D.

On the other hand, while the in-process products stored in the storage cabinet 10b are all the in-process products positioned before the processes using the processing apparatus B, it is necessary to separate storage areas according to a process to be performed since the processing apparatus B is commonly used in the key processes, which are process 2, process 4, and process 6. Thus, the storage cabinet 10b corresponding to the processing apparatus B is separated into storage areas $10b_1$, $10b_2$, and $10b_3$. In these storage areas $10b_1$, $10b_2$, and $10b_3$, the in-process products conveyed from the processing apparatuses A, C, and D are stored, respectively.

Figure 2:
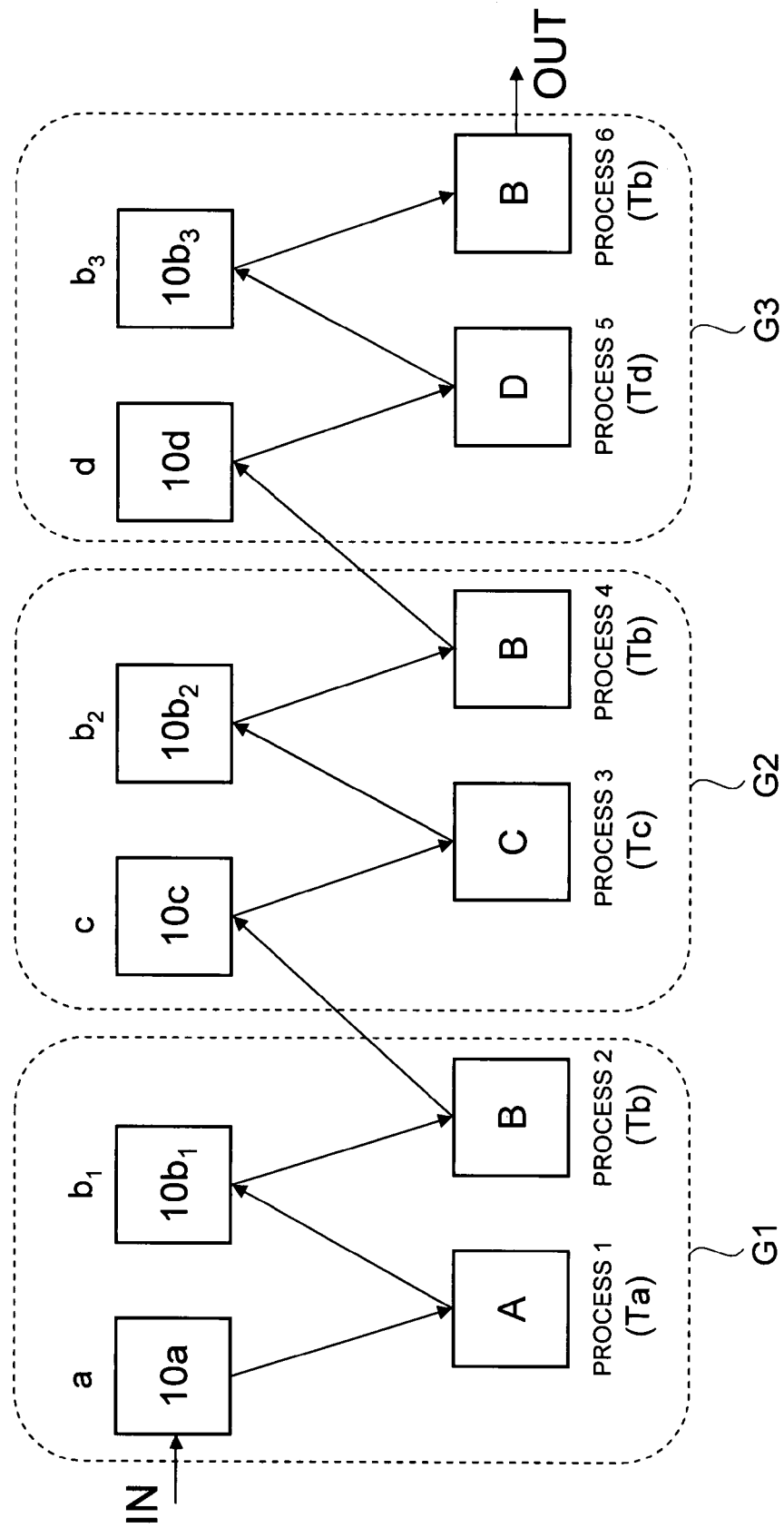
FIG. 2 is a schematic diagram for explaining a flow of an in-process product in the production line shown in FIG. 1.

Therefore, as shown in FIG. 2, the in-process product stored in the storage area $10b_1$ is the in-process product positioned immediately before process 2, the in-process product stored in the storage area $10b_2$ is the in-process product positioned immediately before process 4, and the in-process product stored in the storage area $10b_3$ is the in-process product positioned immediately before process 6.

As shown in FIG. 2, a series of processes in the production line is classified into a plurality of groups based on the key processes. The processes are grouped so that one group includes processes from a process subsequent to a key process to a next key process. Therefore, in the present embodiment, the processes are grouped into a group G1 that includes from a point before the first process (process 1) up to the first key process (process 2), a group G2 that includes from a point after the first key process (process 2) up to the second key process (process 4), and a group G3 that includes from a point after the second key process (process 4) up to the last key process (the third key process: process 6).

Referring back to FIG. 1, the processes in the production line is explained. A conveying apparatus 20 is provided between the processing apparatus B and the storage cabinet 10b. The conveying apparatus 20 conveys either one of the in-process products stored in the three storage areas $10b_1$, $10b_2$, and $10b_3$. Which in-process product is to be conveyed is determined based on a decision signal 31a provided from a determining unit 31. The determining unit 31 includes an algorism storage unit 41 and a processing unit 42. The processing unit 42 generates the decision signal 31a using a predetermined algorism stored in the algorism storage unit 41 when count data 32a and condition data 33a are provided from a counting unit 32 and a condition designating unit 33, respectively.

The counting unit 32 counts the number of the in-process products stored in the storage cabinets 10a to 10d. The counting unit 32 is capable of counting the number of the in-process products for each of the storage cabinets 10a, 10c, 10d, and the storage areas $10b_1$ to $10b_3$. Accordingly, the count data 32a that is an output of the counting unit 32 indicates the number of the in-process products in each of these storage cabinets and the storage areas. However, in the present invention, it is not indispensable for the counting unit 32 to be capable of acquiring the number of the in-process products of each of the storage cabinets and the storage areas, and it is sufficient if the number of the in-process products at least for each of the groups can be acquired. In this case, the count data 32a that is the output of the counting unit 32 indicates the number of the in-process products for each of the groups. Although a specific configuration of the counting unit 32 is not particularly limited, counters installed at each of the storage cabinets 10a to 10d can be used.

On the other hand, the condition designating unit 33 selects a calculation algorism of the decision signal 31a. In the present embodiment, an operator selects the calculation algorism manually; therefore, the condition designating unit 33 includes an input device 43 such as a keyboard and a mouse, and a display 44.

Figure 3:
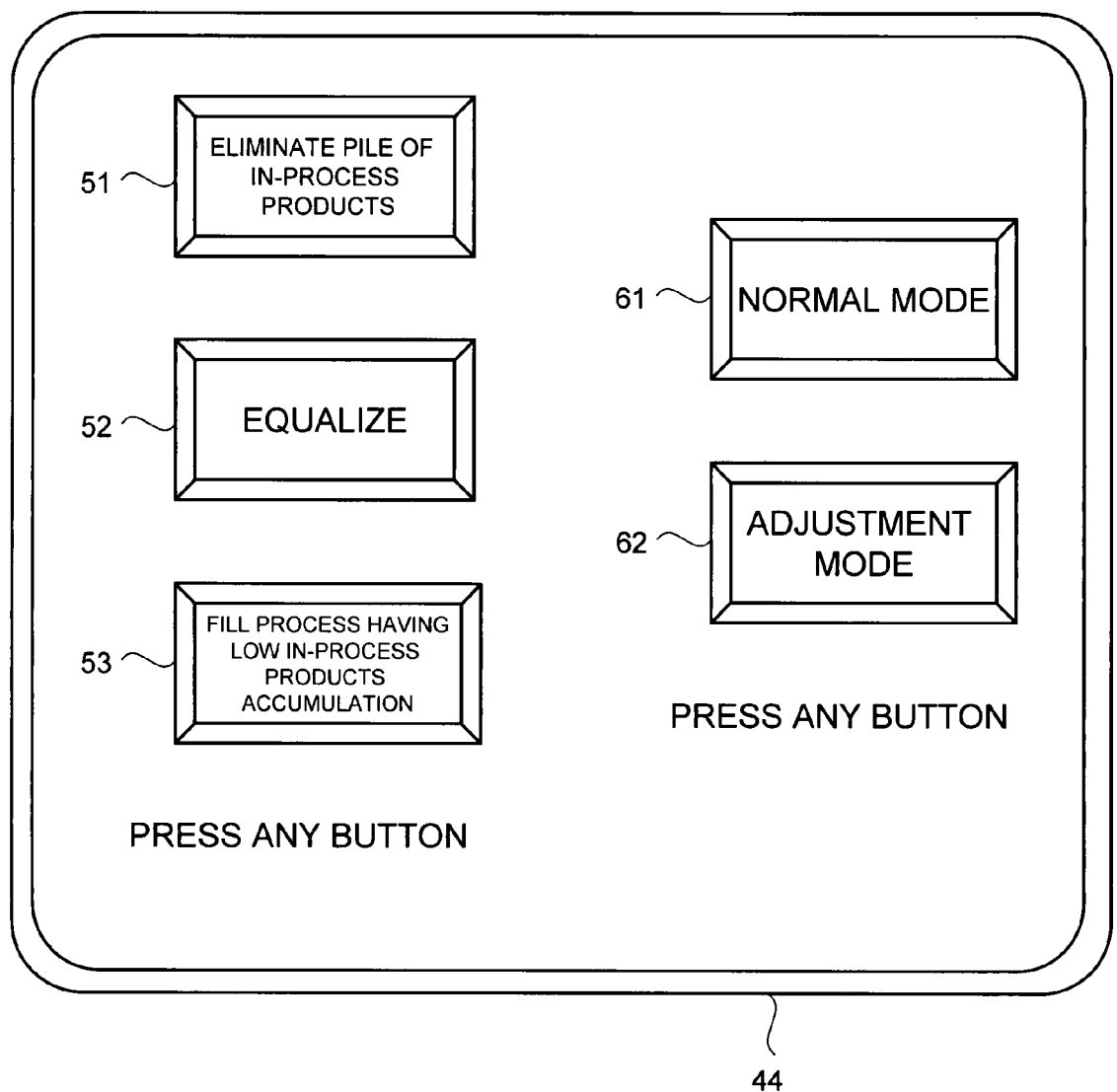
FIG. 3 is a diagram showing an example of a selecting screen displayed on the display 44.

FIG. 3 is a diagram showing an example of a selecting screen displayed on the display 44.

As shown in FIG. 3, when the operator makes selection on the calculation algorism, three selection buttons 51 to 53 to be exclusively selected are displayed on the display 44 included in the condition designating unit 33. For the selection button 51, "ELIMINATE PILE OF IN-PROCESS PRODUCTS" is displayed. This button 51 should be pressed when easing accumulation of many in-process products in key processes (process 2, process 4 and process 6) is the top priority. Furthermore, for the selection button 52, "EQUALIZE" is displayed. This button 52 should be pressed when equalizing the number of the in-process products accumulated before each process throughout the processes is the top priority. Furthermore, for the selection button 53, "FILL PROCESS HAVING LOW IN-PROCESS PRODUCTS ACCUMULATION" is displayed. This button 53 should be pressed when there is a process having a small number of in-process products, and when increasing the number of the in-process products at such a process is the top priority.

Furthermore, two other selection buttons 61 and 62 to be exclusively selected are displayed on the display 44. For the selection button 61, "NORMAL MODE" is displayed. This button 61 should be pressed in a case where there is no large difference in the number of the in-process products between the groups in a steady state when the respective processes are grouped based on the key processes.

The "case where there is no large difference in the number of the in-process products between groups in a steady state" corresponds to such a case that the required processing times of respective groups are approximately the same, or have no large difference. If there is a large difference in the required processing time between the groups, this entire group becomes a bottleneck; therefore, production lines are usually designed such that the required processing times in respective groups become approximately the same. Accordingly, normally, this "NORMAL MODE" should be selected.

On the other hand, for the selection button 62, "ADJUSTMENT MODE" is displayed. This button 62 should be pressed in a case where there is a large difference in the number of the in-process products between the groups in a steady state when the respective processes are grouped based on the key processes. The "case where there is a large difference in the number of the in-process products between groups in a steady state" corresponds to such a case that there are some difference between the required processing times of respective groups. As described above, production lines are usually designed such that the required processing times in respective groups become approximately the same; however, a difference can be caused in the required processing times between the groups due to failure of apparatuses and the like in actual cases. In such a case, this "ADJUSTMENT MODE" should be selected.

When these selection buttons 51 to 53 and the selection buttons 61 and 62 are displayed on the display 44, the operator presses either one of the selection buttons 51 to 53 and presses either one of the selection buttons 61 and 62 using a mouse and the like. Such condition selection is performed by the operator, and results thereof are provided to the determining unit 31 as the condition data 33a.

Since the condition selection by the operator is performed by pressing one of the three selection buttons 51 to 53 and pressing one of the two selection buttons 61 and 62 as describe above, one of six conditions shown in FIG. 4 is to be selected. These six conditions correspond to six calculation algorisms (first algorism to sixth algorism) that are stored in the algorism storage unit 41 in the determining unit 31 respectively, the processing unit 42 in the determining unit 31 performs calculation using a selected calculation algorism on the count data 32a to be provided by the counting unit 32, to generate the decision signal 31a.

A specific calculation algorism for the decision signal 31a is explained next.

Figure 5:
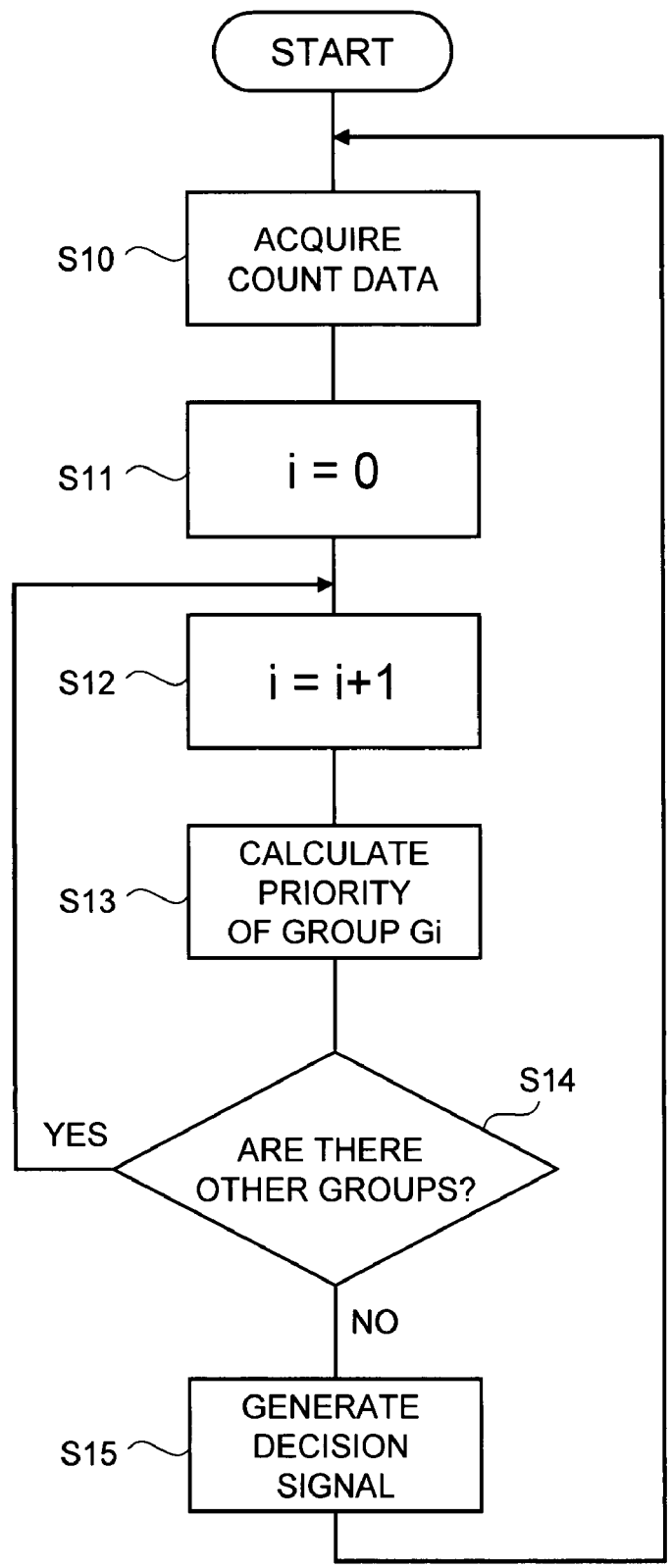
FIG. 5 is a common flowchart showing the calculation algorism.

FIG. 5 is a common flowchart showing the calculation algorism.

As shown in FIG. 5, the processing unit 42 in the determining unit 31 acquires the count data 32a provided by the counting unit 32 (step S10). The count data 32a can be acquired by requesting the counting unit 32 for the count data 32a, or by taking the count data 32a that is periodically or constantly provided from the counting unit 32 at predetermined timing.

A variable i is reset to 0 (step S11), and then incremented (step S12). The variable i is a value to specify the groups G1 to G3. In this case, since the variable i=1 is obtained by increment at step S12, the group G1 is specified first.

Priority of the group G1 is calculated next (step S13). Since calculating formulas are different depending on the algorism, details will be described later.

It is determined whether a group for which calculation of priority has not been performed is remained (step S14). As a result, if there is a group remained for which the calculation of priority has not been performed (step S14: YES), the process returns to step S12 to increment the variable i. Thus, the calculation of priority is completed for all of the groups (groups G1 to G3) (step S14: NO), the decision signal 31a is generated based on the priority of each of the groups (step S15). Generation of the decision signal 31a is performed by selecting the group having the highest priority (having the largest acquired value), and the group indicated by the decision signal 31a is the group having the highest priority.

The decision signal 31a thus generated is provided to the conveying apparatus 20 as shown in FIG. 1, and according to this signal, the conveying apparatus 20 conveys an in-process product from a storage area corresponding the group having the highest priority among the storage areas $10b_1$ to $10b_3$ to the processing apparatus B. For example, if the decision signal 31a indicates that the group G1 is the group having the highest priority, an in-process product is conveyed from the storage area $10b_1$ that is included in the group G1 among the storage areas $10b_1$ to $10b_3$ to the processing apparatus B.

Upon completion of step S15, the process returns to step S10 to re-acquire the count data 32a. The re-acquisition of the count data 32a is preferable to be performed after a certain period of time by using a timer and the like.

A method of calculation of priority (step S13) is explained for each of the algorisms next. In the explanation below, as shown in FIG. 2, the in-process products stored in the storage cabinets 10a, 10c, and 10d are expressed as "a", "c", and "d", respectively, and the in-process products stored in the storage areas $10b_1$ to $10b_3$ are expressed as "b1", "b2", and "b3", respectively. When the in-process products included in groups G1, G2, and G3 are expressed as "g1", "g2", and "g3", respectively, it is defined as $$g1=a+b1$$

$$g2=c+b2$$

$$g3=d+b3.$$

If the processing apparatuses are included in the respective groups, the number of the in-process products that are being processed should also be counted in the number of the in-process products of the respective groups "g1", "g2", and "g3"; however, since the number of the in-process products that are being processed is considered to be substantially small compared to the number of the in-process products accumulated in the storage cabinets 10a to 10d, in the present embodiment, the number of the in-process products that are being processed is not included in the "g1", "g2", and "g3". Of course, the number of the in-process products that are being processed can be included in "g1", "g2", and "g3".

First, a case where the first algorism is selected is explained.

The first calculation algorism is an algorism to be selected when the selection button 51 for which "ELIMINATE PILE OF IN-PROCESS PRODUCTS" is displayed and the selection button 61 for which "NORMAL MODE" is displayed are pressed as shown in FIG. 4.

When the first algorism is selected, priority Pi calculated at step S13 is $$Pi=gi$$

where the number of the in-process products included in a subject group for the calculation. Pi represents priority corresponding to a subject group Gi for calculation, and therefore, in the present embodiment, three values P1, P2, and P3 are to be calculated.

When the first algorism is selected, for example, if specific numbers of the in-process products are as shown in FIG. 6, $$P1=18$$

$$P2=9$$

$$P3=13$$

and since the priority P1 has the largest value, the group G1 corresponding thereto is selected at step S15 shown in FIG. 5.

In other words, the decision signal 31a output by the determining unit 31 specifies the group G1, and according to this signal, the conveying apparatus 20 conveys an in-process product from the storage area $10b_1$ to the processing apparatus B.

If the priority orders are calculated according to such an algorithm, the processing apparatus B, which performs the key processes, processes the in-process products corresponding to a group having the largest number of the in-process products in priority. Therefore, it is possible to ease the accumulation of many in-process products at the key processes. In other words, a pile of the in-process products can be eliminated.

Next, a case where the second algorithm is selected is explained.

The second calculation algorithm is an algorithm to be selected when the selection button 51 for which "ELIMINATE PILE OF IN-PROCESS PRODUCTS" is displayed and the selection button 62 for which "ADJUSTMENT MODE" is displayed are pressed as shown in FIG. 4.

When the second algorithm is selected, a processing time required to process a single lot of in-process product (a processing time required for one sheet of semiconductor wafer) in each of the processing apparatuses is to be considered. Specifically, when a processing time required for a single in-process product in each of the processing apparatuses A, B, C, and D is Ta, Tb, Tc, and Td, respectively, for example, time TG1 required to complete processes 1 and 2 corresponding to the group G1 is defined as $TG1=Ta+Tb.$ Similarly, time TG2 required to complete processes 3 and 4 corresponding to the group G2 is defined as $TG2=Tb+Tc$ and time TG3 required to complete processes 5 and 6 corresponding to the group G3 is defined as $TG3=Tb+Td.$ When the second algorithm is selected, such a processing time is considered, and specifically, the priority is calculated as $Pi=gi/TGi$ where the required processing time corresponding to the subject group for calculation is "TGi". For example, if specific numbers of the in-process products are as shown in FIG. 6 and FIG. 7, $P1=7.2(=18/2.5)$ $P2=4.5(=9/2)$ $P3\approx 8.7(=13/1.5)$ and the priority P3 has the largest value, the group G3 corresponding thereto is selected at step S15 shown in FIG. 5. In other words, the decision signal 31a output by the determining unit 31 specifies the group G3, and according to this signal, the conveying apparatus 20 conveys an in-process product from the storage area $10b_3$ to the processing apparatus B.

If the priority orders are calculated according to such an algorithm, even in a production line in which there is a large difference in the number of the in-process products between groups due to a difference in the processing time, appropriate selection considering this difference can be made. In other words, even when the numbers of the in-process products significantly vary between groups in a steady state, it is possible to ease accumulation of many in-process products at the key processes.

Next, a case where the third algorithm is selected is explained.

The third calculation algorithm is an algorithm to be selected when the selection button 52 for which "EQUALIZE" is displayed and the selection button 61 for which "NORMAL MODE" is displayed are pressed as shown in FIG. 4.

When the third algorithm is selected, priority is calculated considering not only the number of the in-process products included in a subject group but also the number of the in-process products included in a next group. Specifically, when the third algorithm is selected, priority is calculated as $Pi=gi-g(i+1).$ "g(i+1)" represents the number of the in-process products included in the next group, and in the present embodiment, when i=3, it can be defined as $g(i+1)=0$ or $g(i+1)=g1.$ Specifically, the former should be applied when CONWIP in which manufacturing of new products is started for an amount equivalent to the number of finished products is not considered, and the latter should be applied when the CONWIP is considered.

For example, if specific numbers of the in-process products are as shown in FIG. 6, and the CONWIP is considered, $P1=9(=18-9)$ $P2=-4(=9-13)$ $P3=-5(=13-18)$ and since the priority P1 has the largest value, the group G1 corresponding thereto is selected at step S15 shown in FIG. 5. In other words, the decision signal 31a output by the determining unit 31 specifies the group G1, and according to this signal, the conveying apparatus 20 conveys an in-process product from the storage area $10b_1$ to the processing apparatus B.

If the priority orders are calculated according to such an algorism, comparing with the number of the in-process products accumulated in a next group, the in-process products corresponding to a group having the larger number of the in-process products accumulated are to be processed in priority. Therefore, it is possible to equalize the number of the in-process products. In other words, the in-process products accumulated in the respective processes can be equalized through but the processes.

Next, a case where the fourth algorithm is selected is explained.

The fourth calculation algorithm is an algorithm to be selected when the selection button 52 for which "EQUALIZE" is displayed and the selection button 62 for which "ADJUSTMENT MODE" is displayed are selected as shown in FIG. 4.

When the fourth algorithm is selected, in addition to the third algorithm, a processing time required to process a single lot of in-process product (a processing time required for one sheet of semiconductor wafer) in each of the processing apparatuses is to be considered. Specifically, in the case where the fourth algorithm is selected, when the required processing time corresponding to a next group is TG(i+1), priority is calculated by $$Pi=(gi/TGi)-\{g(i+1)/TG(i+1)\}.$$

For example, if specific numbers of the in-process products and the required processing time are as shown in FIG. 6 and FIG. 7, $$P1=2.7(=7.2-4.5)$$

$$P2\approx-4.2(\approx4.5-8.7)$$

$$P3\approx1.5(\approx8.7-7.2),$$

and since the priority P1 has the largest value, the group G1 corresponding thereto is selected at step S15 shown in FIG. 5 and an in-process product is conveyed from the storage area $10b_1$ to the processing apparatus B.

If the priority orders are calculated according to such an algorithm, even in a production line in which there is a large difference in the number of the in-process products between groups due to a difference in the processing time, it is possible to equalize the numbers of the in-process products.

Next, a case where the fifth algorism is selected is explained.

The fifth calculation algorism is an algorism to be selected when the selection button 53 for which "FILL PROCESS HAVING LOW IN-PROCESS PRODUCTS ACCUMULATION" is displayed and the selection button 61 for which "NORMAL MODE" is displayed are pressed as shown in FIG. 4.

When the fifth algorism is selected, the priority is calculated considering the number of the in-process products in a next group not the number of the in-process products in a subject group. Specifically, when the fifth algorism is selected, the priority is calculated as $$Pi=-g(i+1).$$

Also in this case, when i=3, and the CONWIP is not considered, it is defined as $$g(i+1)=0$$

and when the CONWIP is considered, it is defined as $$g(i+1)=g1.$$

For example, if specific numbers of the in-process products are as shown in FIG. 6, and the CONWIP is considered, $$P1=-9$$

$$P2=-13$$

$$P3=-18,$$

and since the priority P1 has the largest value, the group G1 corresponding thereto is selected at step S15 shown in FIG. 5 and an in-process product is conveyed from the storage area $10b_1$ to the processing apparatus B.

If the priority orders are calculated according to such an algorithm, such a group has higher priority that the subsequent group of which has the small number of the in-process products. In other words, it is controlled such that the number of the in-process products increases in a process having a small number of in-process products. Thus, it becomes possible to prevent a problem such as reduction of an operation rate caused by exhaustion of the in-process products at some processes.

Next, a case where the sixth algorism is selected is explained.

The sixth algorism is an algorism to be selected when the selection button 53 for which "FILL PROCESS HAVING LOW IN-PROCESS PRODUCTS ACCUMULATION" is displayed and the selection button 62 for which "ADJUSTMENT MODE" is displayed are pressed as shown in FIG. 4.

When the sixth algorism is selected, in addition to the fifth algorism, a processing time required to process a single lot of in-process product (a processing time required for one sheet of semiconductor wafer) in each of the processing apparatuses is to be considered. Specifically, when the sixth algorism is selected, the priority is calculated as $$Pi=-g(i+1)/TG(i+1).$$

For example, if specific numbers of the in-process products are as shown in FIG. 6 and FIG. 7, $$P1=-4.5(=-9/2)$$

$$P2=-8.7(=-13/1.5)$$

$$P3=-7.2(=-18/2.5)$$

and since the priority P1 has the largest value, the group G1 corresponding thereto is selected at step S15 shown in FIG. 5, and an in-process product is conveyed from the storage area $10b_1$ to the processing apparatus B.

If the priority orders are calculated according to such an algorithm, even in a production line in which there is a large difference in the number of the in-process products between groups, it becomes possible to prevent a problem such as reduction of an operation rate caused by exhaustion of the in-process products.

As describe above, according to the present embodiment, a production line is classified into groups based on the key processes, and priority orders in processing in the key processes are determined using the number of in-process products of respective processes as a parameter. Thus, it becomes possible to perform determination of the priority orders further according to the actual situation, thereby enabling to improve production efficiency.

While in the above embodiment, the case in which process 6 being the key process is the last process has been explained, a case in which the last process is not the key process is to be explained.

Figure 8:
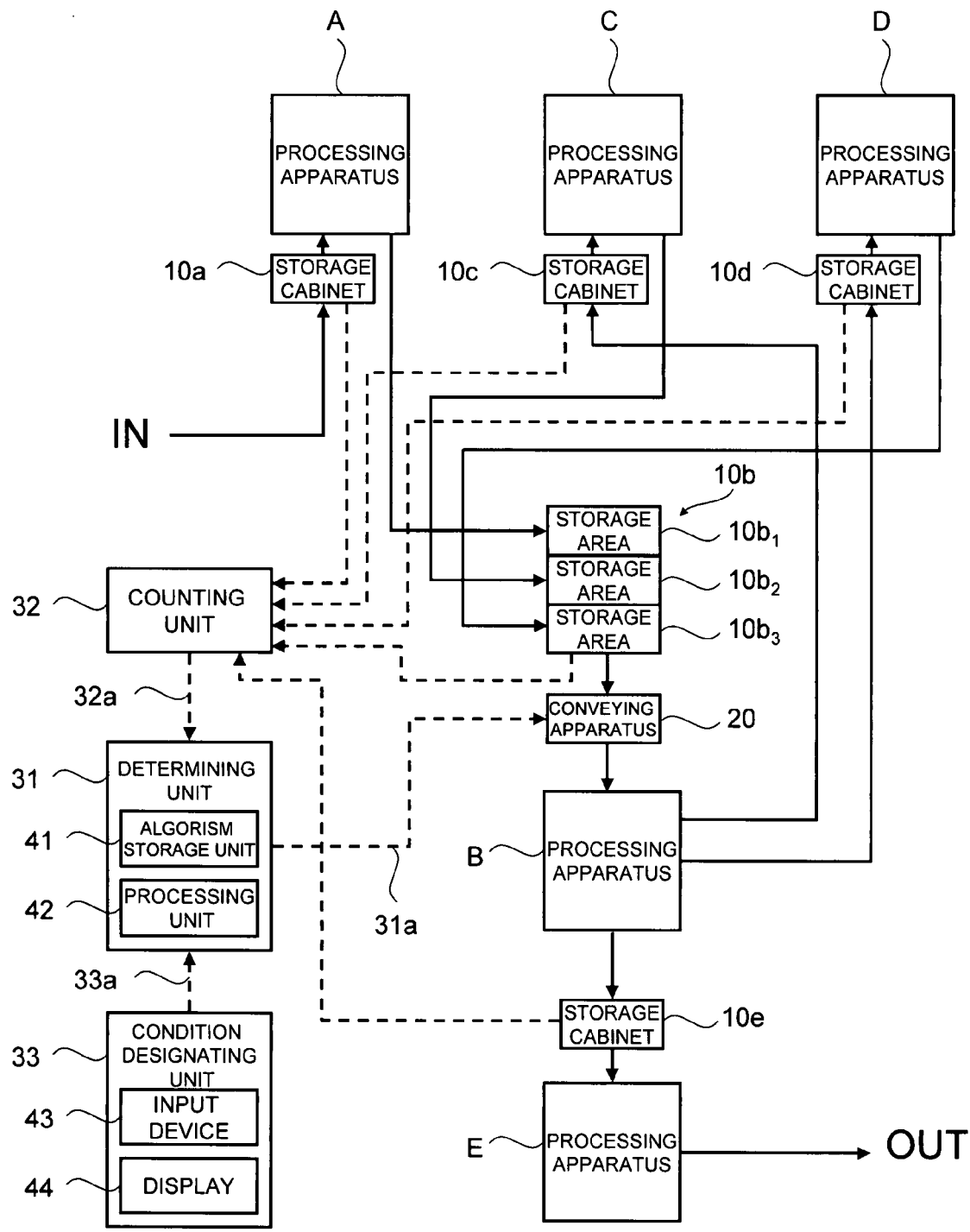
FIG. 8 is a schematic diagram showing a production line according to an example in which the last process is not the key process.

FIG. 8 is a schematic diagram showing a production line according to an example in which the last process is not the key process.

The production line shown in FIG. 8 is different from the production line shown in FIG. 1 in that a processing apparatus E and a storage cabinet 10*e* corresponding thereto are added. Since other points are identical with the production line shown in FIG. 1, like reference characters are given to like components, and redundant explanations will be omitted.

Figure 9:
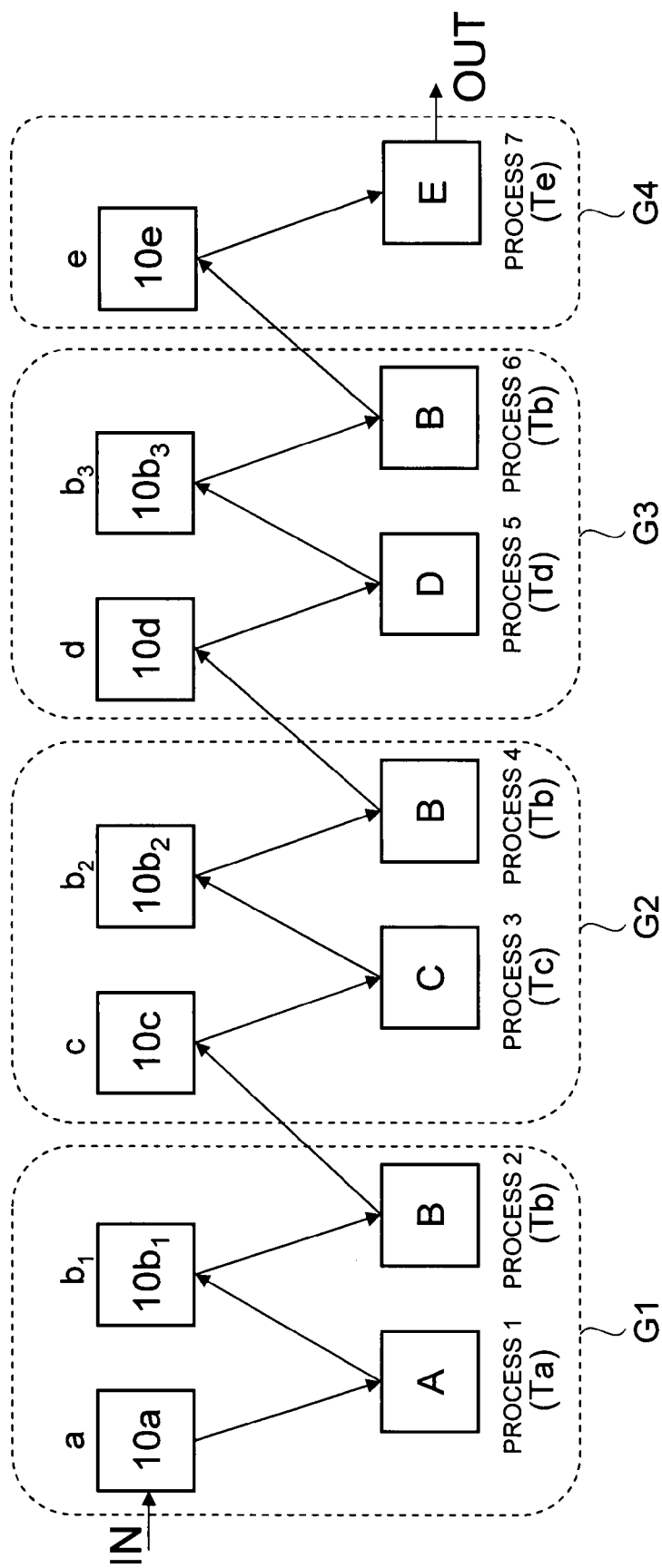
FIG. 9 is a schematic diagram for explaining a flow of an in-process product in the production line shown in FIG. 8, and shows grouping when CONWIP is not considered.
Figure 10:
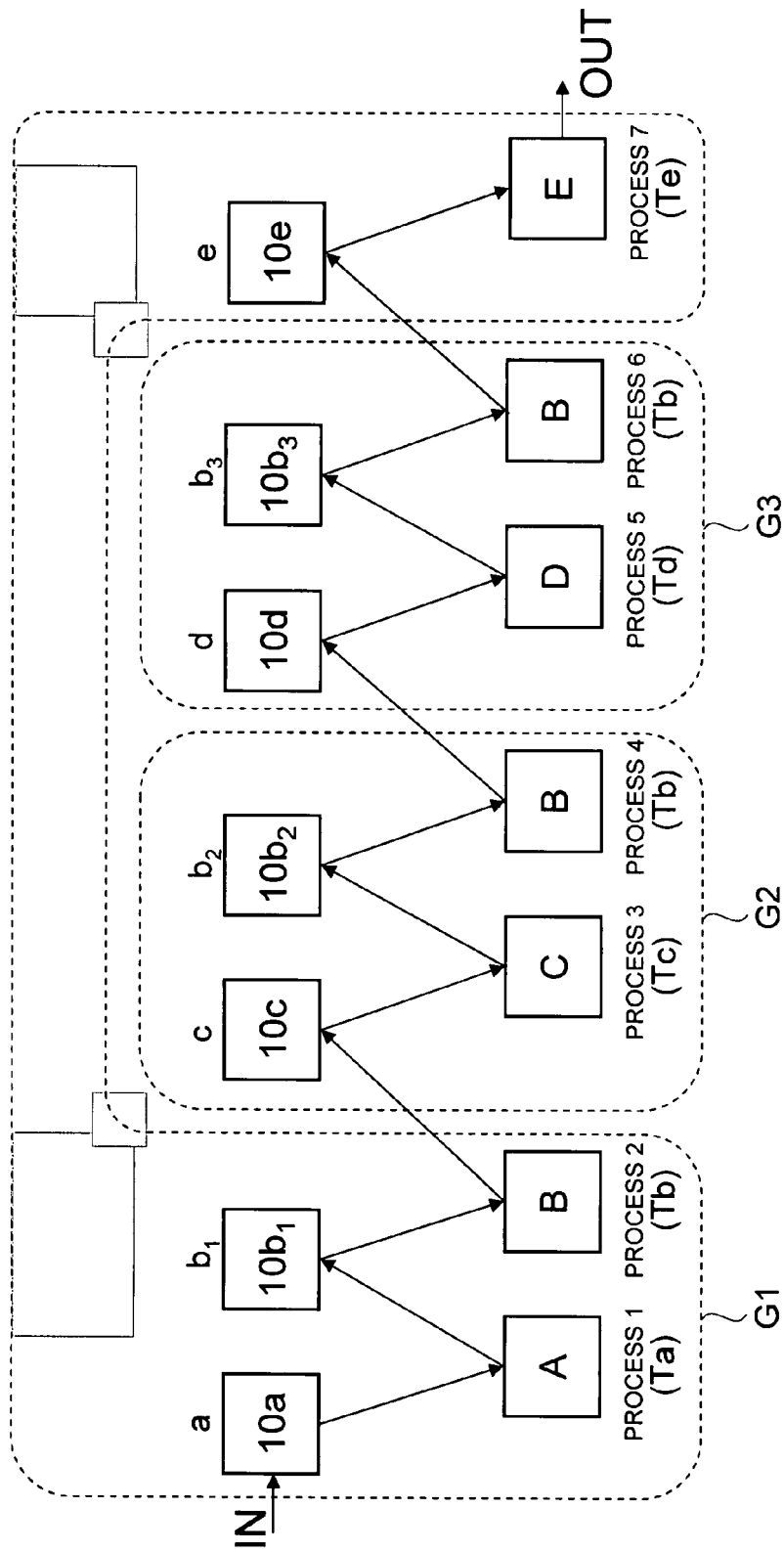
FIG. 10 is a schematic diagram for explaining a flow of an in-process product in the production line shown in FIG. 8, and shows grouping when CONWIP is considered.

The processing apparatus E is to perform process 7 being the last process, and the processing apparatus E and the storage cabinet 10*e* corresponding thereto can compose a group G4 as shown in FIG. 9, or can compose a part of the group G1 as shown in FIG. 10. Specifically, when the CONWIP is not considered, a configuration shown in FIG. 9 should be adopted, and when the CONWIP is considered, a configuration shown in FIG. 10 should be adopted.

Furthermore, although in the above embodiment, an operator manually performs selection of the calculation algorism, such algorism selection can be performed automatically or semi-automatically.

Figure 11:
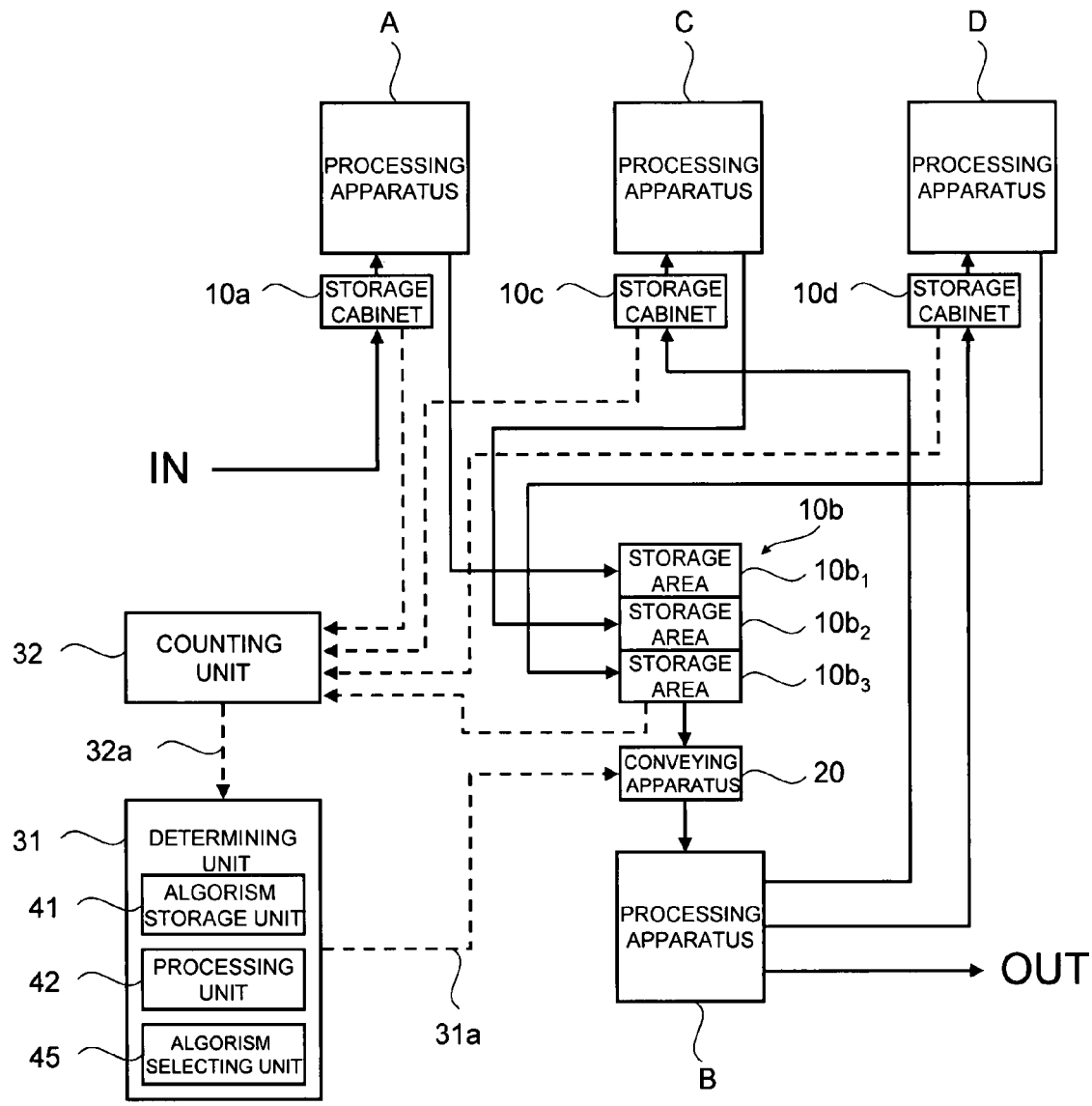
FIG. 11 is a schematic diagram showing a production line according to an example in which the selection of the calculation algorism is automatically performed.

FIG. 11 is a schematic diagram showing a production line according to an example in which the selection of the calculation algorism is automatically performed.

The production line shown in FIG. 11 is different from the production line shown in FIG. 1 in that the condition designating unit 33 is removed but an algorism selecting unit 45 is added in the determining unit 31. Since other points are identical with the production line shown in FIG. 1, like reference characters are given to like components and redundant explanations will be omitted.

The algorism selecting unit 45 is used to select an optimal algorism based on the count data 32a provided from the counting unit 32, and selection is made by performing the following processes.

Figure 12:
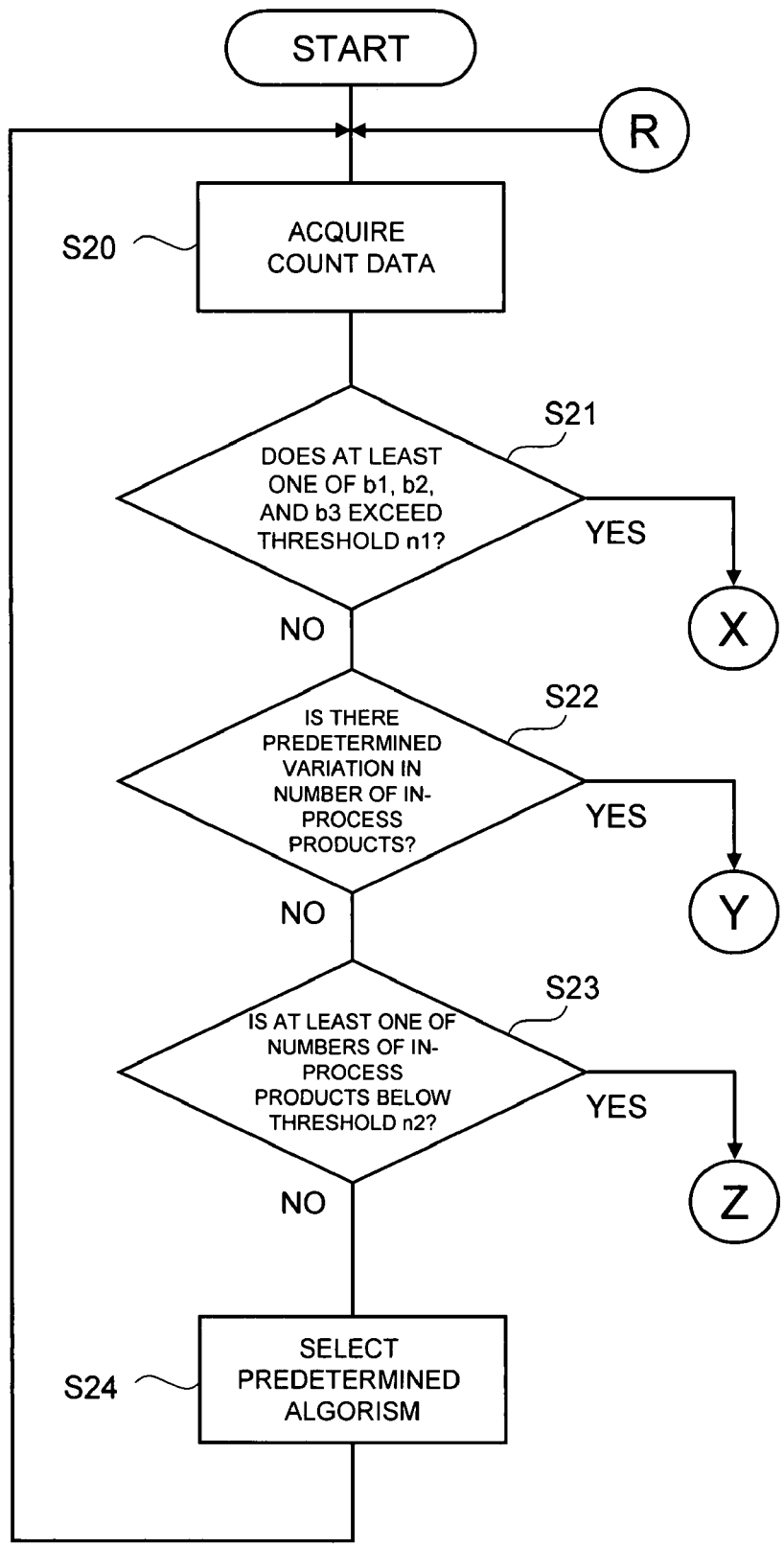
FIG. 12 is a flowchart for explaining a selection operation performed by an algorism selecting unit 45.
Figure 13:
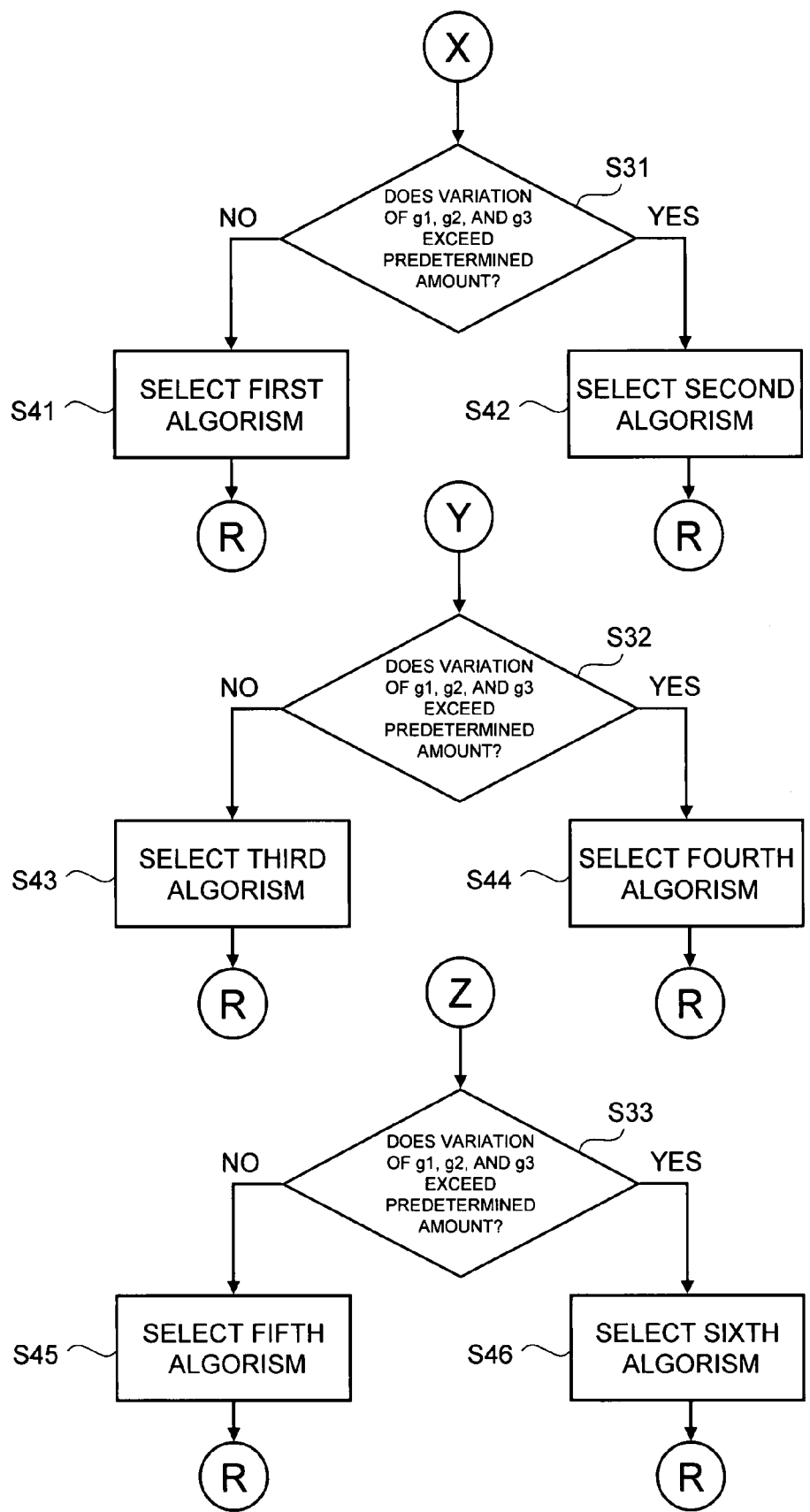
FIG. 13 is a flowchart for explaining the selection operation performed by the algorism selecting unit 45.

FIG. 12 and FIG. 13 are flowcharts for explaining a selection operation performed by the algorism selecting unit 45. Reference characters X, Y, and Z shown in FIG. 12 continue to reference characters X, Y, and Z shown in FIG. 13 respectively. All of reference characters R shown in FIG. 13 continue to a reference character R shown in FIG. 12.

As shown in FIG. 12, the algorism selecting unit 45 in the determining unit 31 first acquires the count data 32a that is provided by the counting unit 32 (step S20). This step and step S10 shown in FIG. 5 can be handled as the same step.

Next, the numbers "b1", "b2", and "b3" of the in-process products stored in the storage areas $10b_1$ to $10b_3$ are referred, and it is determined whether at least one of "b1", "b2", and "b3" exceeds a threshold n1 (step S21). This is to determine whether many in-process products are accumulated at the key processes, in other words, whether a pile of in-process products is necessary to be eliminated.

As a result, if at least one of "b1", "b2", and "b3" exceeds the threshold n1 (step S21: YES), as shown in FIG. 13, variations of the number of the in-process products "g1", "g2", and "g3" included in the respective groups G1, G2, and G3 are calculated, and it is determined whether to exceed a predetermined variation amount (step S31). This is to determine whether there is a large difference in the number of the in-process products between groups, and it can be determined by calculating a standard deviation, etc., of the number of the in-process products "g1", "g2", and "g3".

As a result, if the number of the in-process products of each group does not exceed the variation amount (step S31: NO), the first algorism is selected (step S41). On the other hand, if the number of the in-process products of each group exceeds the variation amount (step S31: YES), the second algorism is selected (step S42). Upon completion of step S41 or S42, the process returns to step S20 shown in FIG. 12, and the count data 32a is re-acquired. The re-acquisition of the count data 32a is preferable to be performed after a certain period of time by using a timer and the like.

Furthermore, as a result of determination at step S21, if it is determined that none of the "b1", "b2", and "b3" exceeds the threshold n1 (step S21: NO), variations of the number of the in-process products "a", "b1", "b2", "b3", "c", and "d" corresponding to the respective processes are calculated, and it is determined whether to exceed a predetermined variation amount (step S22). This is to determine whether there is a large difference in the number of the in-process products between the respective processes, in other words, whether the number of the in-process products is necessary to be equalized through out the processes.

As a result, if the number of the in-process products corresponding to each of the processes exceeds the predetermined variation amount (step S22: YES), the same thing is determined as step S31 (step S32). As a result, if the number of the in-process products of each group does not exceed the variation amount (step S32: NO), the third algorism is selected (step S43), and if the number of the in-process products of each group exceeds the variation amount (step S32: YES), the fourth algorism is selected (step S44). Upon completion of step S43 or S44, the process returns to step S20, and the count data 32a is re-acquired. Also at this time, the re-acquisition of the count data 32a is preferable to be performed after a certain period of time by using a timer and the like.

On the other hand, as a result of determination at step S22, if the number of the in-process products corresponding to each of the processes does not exceed the predetermined variation amount (step S22: NO), it is determined whether at least one of the numbers of the in-process products "a", "b1", "b2", "b3", "c", and "d" corresponding to the respective processes is below a predetermined threshold n2 (<n1) (step S23). This is to determine whether there is a process having a small number of in-process products, in other words, whether there is a process that should be controlled to increase the number of the in-process products.

As a result, if at least one of the number of the in-process products "a", "b1", "b2", "b3", "c", and "d" is below the threshold n2 (step S23: YES), the same thing is determined as step S31 (step S33). As a result, if the number of the in-process products of each group does not exceed the variation amount (step S33: NO), the fifth algorism is selected (step S45), and if the number of the in-process products of each group exceeds the variation amount (step S33: YES), the sixth algorism is selected (step S46). Upon completion of step S45 or S46, the process returns to step S20, and the count data 32a is re-acquired. Also at this time, the re-acquisition of the count data 32a is preferable to be performed after a certain period of time by using a timer and the like.

On the other hand, as a result of determination at step S23, if none of the number of the in-process products "a", "b1", "b2", "b3", "c", and "d" is below the threshold n2 (step S23: NO), a predetermined algorism (the first algorism, for example) that has been set in advance is selected (step S24) Upon completion of step S24, the process returns to step S20, and the count data 32a is re-acquired. Also at this time, the re-acquisition of the count data 32a is preferable to be performed after a certain period of time by using a timer and the like.

As described above, by automatically selecting the algorism using the algorism selecting unit 45, operations by an operator becomes unnecessary.

While a preferred embodiment of the present invention has been described hereinbefore, the present invention is not limited to the aforementioned embodiment and various modifications can be made without departing from the spirit of the present invention. It goes without saying that such modifications are included in the scope of the present invention.

For example, although the processing apparatus (the processing apparatus B) with which the key processes are performed is one in the above embodiment, the present invention is also applicable to a case in which a plurality of such processing apparatuses are included in a single production line.

Furthermore, as the number of the in-process products of each group, the number of in-process products present just before each of the key processes can be used, for simplicity. In this case, when the number of the in-process products included in each of groups G1, G2, and G3 are "g1", "g2", and "g3", respectively, it is defined as g1=b1 g2=b2 g3=b3.

By this method, although its calculation accuracy is reduced, it is possible to simplify the counting process.

Furthermore, while in the above embodiment, the case in which the present invention is applied to a production line of semiconductor chips has been explained as an example, the present invention is not limited thereto and is applicable to all kinds of job-shop production lines.

What is claimed is:

1. A production management method for a production line including a series of processes that includes a plurality of key processes performed by a same processing apparatus, the method comprising:
    using a storage portion to classify the series of processes into a plurality of groups that each includes an associated one of the key processes performed by the same processing apparatus;
    storing, in an algorithm storage unit, plural algorithms that each defines a different method for determining priority orders for the key processes performed by the same processing apparatus;
    using a counting unit to obtain a number of in-process products that are present in each group of the plurality of groups;
    using an input device to select one of the plural algorithms;
    using a determining unit to determine priority orders of the key processes performed by the same processing apparatus based on the obtained number of the in-process products in each group and the selected algorithm; and
    executing each of the key processes with the same processing apparatus in an order that is based on the determined priority orders.

2. The production management method as claimed in claim 1, wherein the obtaining step is performed by calculating, for each of the groups, entire number of in-process products that are present from a point after a predetermined key process up to a next key process.

3. The production management method as claimed in claim 2, wherein a first group included in the production line includes from a point before a first process up to a first key process included in the production line.

4. The production management method as claimed in claim 3, wherein the first group further includes from after a last key process up to a last process point included in the production line.

5. The production management method as claimed in claim 1, wherein the obtaining step is performed by calculating, for each of the groups, number of in-process products that are present just before each of the key processes.

6. The production management method as claimed in claim 1, wherein the determining step includes determining the priority orders such that higher priority is given to a key process in a group having large number of the in-process products.

7. The production management method as claimed in claim 6, wherein the determining step includes determining the priority orders such that higher priority is given to a key process in a group for which a required processing time is short.

8. The production management method as claimed in claim 1, wherein the determining step includes determining the priority orders such that higher priority is given to a key process in a predetermined group, when number of the in-process products corresponding to the predetermined group is larger than number of the in-process products corresponding to a next group.

9. The production management method as claimed in claim 8, wherein the determining step includes determining the priority orders such that higher priority is given to a key process in the predetermined group, when a required processing time of the predetermined group is shorter than a required processing time of the next group.

10. The production management method as claimed in claim 1, wherein the determining step includes determining the priority orders such that higher priority is given to a key process in a group immediately before a group having a small number of in-process products.

11. The production management method as claimed in claim 10, wherein the determining step includes determining the priority orders such that higher priority is given to a key process in a group immediately before a group for which a required processing time is short.

12. A production management system that manages a production line including a series of processes that includes a plurality of key processes performed by a same processing apparatus, the system comprising:
    a storage portion that classifies the series of processes into a plurality of groups that each includes an associated one of the key processes performed by the same processing apparatus;
    an algorithm storage unit that stores plural algorithms that each defines a different method for determining priority orders for the key processes performed by the same processing apparatus;
    a counting unit that obtains number of in-process products of each group of the plurality of groups;
    an input device for selecting one of the plural algorithms from the algorithm storage unit;
    a determining unit that determines priority orders of the key processes performed by the same processing apparatus based on the obtained number of the in-process products of each of the groups and the selected algorithm; and
    the same processing apparatus that executes each of the key processes in an order based on the determined priority orders.

13. The production management system as claimed in claim 12, wherein the algorithm storage unit stores at least a first algorithm to determine the priority orders such that higher priority is given to a key process in a group having a large number of in-process products, and a second algorithm to determine the priority orders such that higher priority is given to a key process in a group immediately before a group having a small number of in-process products.

14. The production management system as claimed in claim 13, wherein the algorithm storage unit further stores a third algorithm to determine the priority orders such that higher priority is given to a key process in a predetermined group when number of the in-process products corresponding to the predetermined group is larger than number of the in-process products corresponding to a next group.

15. The production management system as claimed in claim 12, wherein the counting unit obtains a number of the in-process products of each of processes included in the production line.

* * * * *